United States Patent [19]

Goe, Jr.

[11] Patent Number: 5,483,416
[45] Date of Patent: Jan. 9, 1996

[54] ADJUSTABLE INSULATING BARRIER ARRANGEMENT FOR AIR INSULATED PADMOUNTED SWITCHGEAR

[75] Inventor: Melvin B. Goe, Jr., Centralia, Mo.

[73] Assignee: Hubbell Incorporated, Orange, Conn.

[21] Appl. No.: 353,630

[22] Filed: Dec. 12, 1994

[51] Int. Cl.⁶ .............................. H02B 3/00; H02B 13/00
[52] U.S. Cl. ............................ 361/600; 218/1; 200/50 A; 361/605; 361/617
[58] Field of Search .............................. 200/50 R, 50 A, 200/50 AA, 293; 361/600, 605, 607, 609, 610, 612, 615, 617

[56] References Cited

U.S. PATENT DOCUMENTS

| | | | |
|---|---|---|---|
| 4,351,990 | 9/1982 | Hesselbart et al. | 200/50 AA |
| 4,791,530 | 12/1988 | Kalvaitis et al. | 361/600 |
| 4,797,777 | 1/1989 | Beard | 361/115 |
| 4,798,922 | 1/1989 | Roberts | 200/400 |
| 4,886,945 | 12/1989 | Roberts et al. | 218/1 |
| 5,062,022 | 10/1991 | Beard et al. | 361/605 |
| 5,181,158 | 1/1993 | Goe, Jr. et al. | 361/605 |
| 5,181,164 | 1/1993 | Beard et al. | 361/617 |

*Primary Examiner*—J. R. Scott
*Attorney, Agent, or Firm*—Jerry M. Presson; Michael R. Swartz

[57] ABSTRACT

A barrier arrangement for use in a multiple-phase padmounted switchgear includes a pair of insulated upper and lower barrier panels mounted in spaced vertical tandem and stationary relation one above the other so as to define a gap therebetween and an insulated intermediate barrier panel disposed adjacent to the gap between the upper and lower barrier panels. The barrier panels are disposed within an enclosure of the switchgear between the pairs of multi-phase switchgear assemblies. The intermediate barrier panel is mounted to the upper barrier panel so as to undergo sliding movement between lowered and raised positions relative to the lower barrier panel so as to respectively open and close the gap between the upper and lower barrier panels in response to insertion and withdrawal of a transversely disposed additional barrier panel through the gap. The intermediate barrier panel has a forward edge which includes a lower portion extending downwardly and rearwardly in an declining oblique relation to the direction of movement of the intermediate barrier panel between the lowered and raised positions such that engagement of the transversely disposed additional barrier panel with the lower portion of the forward edge causes a camming action thereon which lifts the intermediate barrier panel from the lowered position to the raised position.

18 Claims, 4 Drawing Sheets

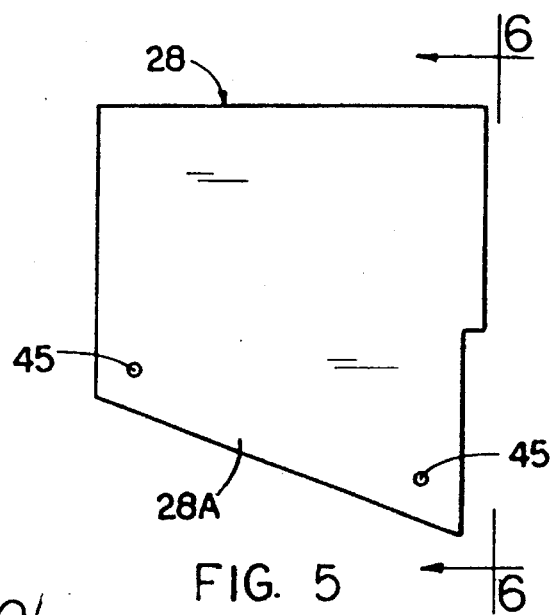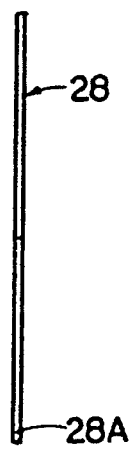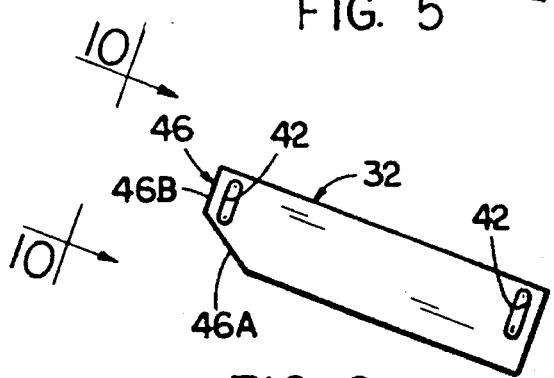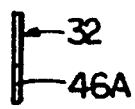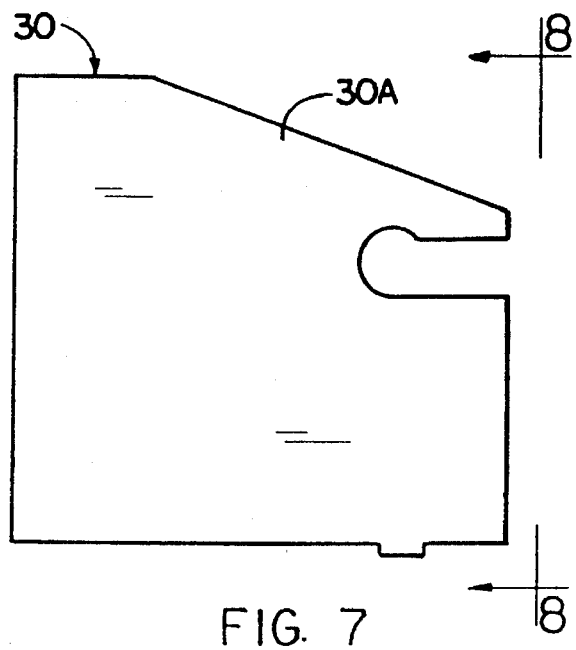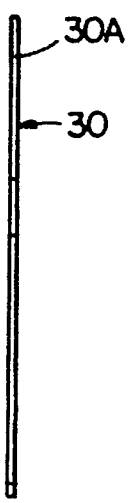

1

ADJUSTABLE INSULATING BARRIER ARRANGEMENT FOR AIR INSULATED PADMOUNTED SWITCHGEAR

BACKGROUND OF THE INVENTION

1. Field of the Invention

The present invention generally relates to multiple-phase electrical distribution devices and, more particularly, is concerned with an air insulated padmounted switchgear having an adjustable insulating barrier arrangement employed therein.

2. Description of the Prior Art

Multi-phase padmounted switchgear is conventionally used in underground electrical distribution systems to permit ground level access to switching components in order to permit visual inspection and maintenance thereof. The electrical distribution system can be operated conveniently by a lineman standing on the ground adjacent to an enclosure of the padmounted switchgear. U.S. Pat. No. 4,886,945 to Roberts et al, U.S. Pat. No. 5,181,158 to Goe, Jr. et al and U.S. Pat. No. 5,181,164 to Beard et al, all of which are assigned to the assignee of the subject application, disclose such padmounted switchgear.

The multi-phase padmounted switchgear includes an enclosure with a plurality of side-by-side spaced three-phase switchgear assemblies disposed therein. Each switchgear assembly typically includes an upper conductor supported in the enclosure by an insulator secured to the top of the enclosure and a lower contact electrically connectable to the upper conductor. The upper conductor includes a fixed contact having an arc chute and the lower contact includes a switch blade that is pivotable about a shaft between a closed position in which it is disposed adjacent to the arc chute and an opened position in which it is pivoted downwardly away from the arc chute. When in the closed position, the switch blade is in engagement with the fixed contact such that electrical current flows through the switchgear assembly. When in the opened position, the switch blade is pivoted out of engagement with fixed contact such that electrical current flow is interrupted through the switchgear assembly.

One safety aspect associated with the use of such padmounted switchgear involves the need for separating the phases of electricity within the apparatus from one another in order to prevent physical contact or electrical communication between the phases. Electrically conductive gases are typically formed inside the arc chutes during electrical current interruption. If unimpeded, these gases can quickly migrate inside the switch enclosure and cause undesirable and possibly dangerous electrical flashover between the switch phases. Thus, upper and lower barrier panels made of insulated material are vertically mounted between the switch phases with the lower edges of the upper barrier panels overlapping the upper edges of the lower barrier panels to prevent migration of the conductive gases past them and from one switch phase to the next.

The upper and lower barrier panels are designed to be in place at all times except while maintenance is being performed on the lower portions of the switchgear assemblies or the attached cables. During these periods of maintenance, another or an additional insulated barrier panel, portable in construction, is needed, this time for placement in a generally transverse or horizontal position, between the vertically-mounted upper and lower barrier panels, to electrically isolate the lower portion of the switchgear assemblies from the upper portion thereof and to prevent the switch blades from inadvertently closing and thus energizing the areas being serviced.

The lineman performing the maintenance must insert the additional portable barrier panel when needed. A problem arises due to the fact that the upper and lower barrier panels are factory-installed to intersect or overlap with one another to block gas migration. In order for the lineman to properly install the portable barrier panel, the factory-installed upper and lower vertical barrier panels need to be moved and relocated slightly to create a gap between them to receive the portable barrier panel.

Consequently, a need exists for a solution to the problem of how to create such gap between the factory-installed upper and lower vertical barrier panels and still block gas migration.

SUMMARY OF THE INVENTION

The present invention provides a barrier arrangement in an air-insulated padmounted switchgear designed to satisfy the aforementioned needs. The barrier arrangement of the present invention involves permanently relocating the upper and lower vertical barrier panels to produce the desired gap and then mounting an intermediate barrier panel to the upper barrier panel in a position to close the gap. The intermediate barrier panel is mounted to the upper barrier panel in a manner which makes the intermediate barrier panel yield and raise from its blocking position in response to insertion of the additional portable barrier panel by moving upwardly through a distance sufficient to allow passage of the horizontally-positioned portable barrier panel into the gap. Then, when maintenance has been completed and the portable barrier panel removed, the intermediate barrier panel will automatically return to its lower blocking position.

Accordingly, the present invention is directed to a barrier arrangement employed in a multiple-phase distribution apparatus including an enclosure and at least two electrical transmission components for controlling separate phases of electricity within the apparatus being laterally spaced from one another. The barrier arrangement of the present invention comprises: (a) a pair of insulated upper and lower barrier panels mountable within the enclosure of the apparatus between the two electrical transmission components in spaced vertical tandem and stationary relation one above the other so as to define a gap therebetween; (b) an insulated intermediate barrier panel disposed adjacent to the gap between the upper and lower barrier panels; and (c) means for mounting the intermediate barrier panel to the upper barrier panel so as to undergo movement between lowered and raised positions relative to the lower barrier panel so as to respectively open and close the gap between the upper and lower barrier panels in response to insertion and withdrawal of a transversely disposed additional barrier panel through the gap. The multiple-phase distribution apparatus is an air-insulated padmounted switchgear and the two electrical transmission components are a plurality of multi-phase switchgear assemblies.

More particularly, the mounting means includes a pair of first and second slots defined in one of the upper barrier panel and intermediate barrier panel and preferably in the latter. The first and second slots are defined adjacent to respective forward and rearward end portions thereof and extend in the direction of movement of the intermediate panel between the lowered and raised positions. The mounting means also includes a pair of first and second fasteners mounted to the other of the upper barrier panel and intermediate barrier panel and preferably in the former. The first and second fasteners are disposed adjacent to respective forward and rearward end portions thereof and project outwardly therefrom and through the respective first and second slots.

To facilitate its sliding movement between the lowered and raised positions, the intermediate barrier panel has a forward edge which includes a lower portion extending downwardly and rearwardly in an declining oblique angular relation to the direction of movement of the intermediate barrier panel between the lowered and raised positions. Engagement of the transversely disposed additional barrier panel with the angular lower portion of the forward edge of the intermediate barrier panel causes a camming action thereon which lifts the intermediate barrier panel from the lowered position to the raised position. The forward edge of the intermediate barrier panel also includes an upper portion extending generally parallel to the direction of movement of the intermediate barrier panel between the lowered and raised positions. In the lowered position closing the gap, opposite upper and lower edge portions of the intermediate barrier panel overlap with adjacent edge portions of the upper and lower barrier panels.

These and other features and advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 5 is a side elevational view of the upper barrier panel.

FIG. 6 is an end elevational view of the upper barrier panel as seen along line 6—6 of FIG. 5.

FIG. 7 is a side elevational view of the lower barrier panel.

FIG. 8 is an end elevational view of the lower barrier panel as seen along line 8—8 of FIG. 7.

FIG. 9 is a side elevational view of the intermediate barrier panel of the present invention.

FIG. 10 is an end elevational view of the intermediate barrier panel as seen along line 10—10 of FIG. 9.

DETAILED DESCRIPTION OF THE INVENTION

Figure 1:
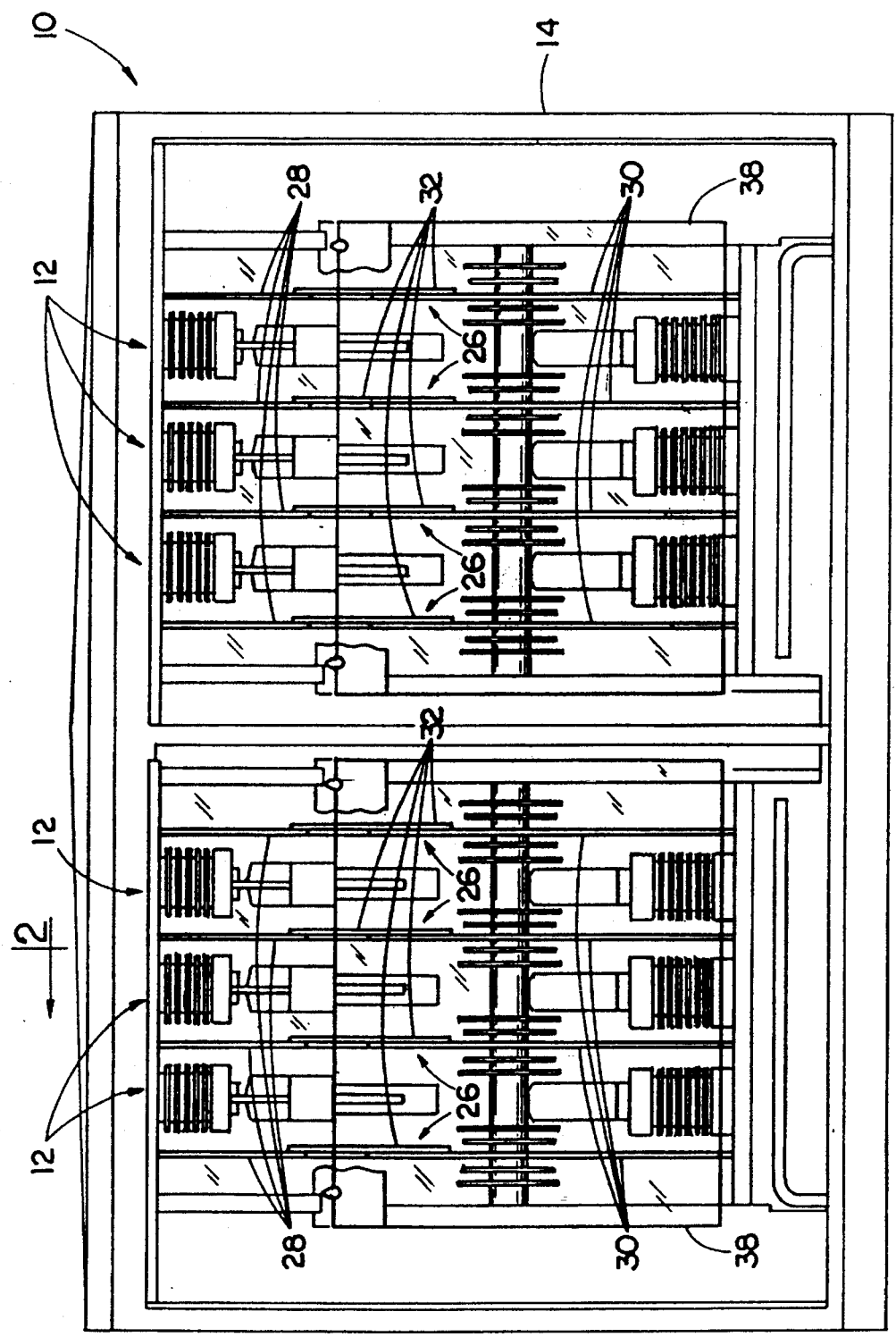
FIG. 1 is a front elevational view of an air-insulated padmounted switchgear employing a plurality of barrier arrangements constructed in accordance with the present invention.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

Figure 2:
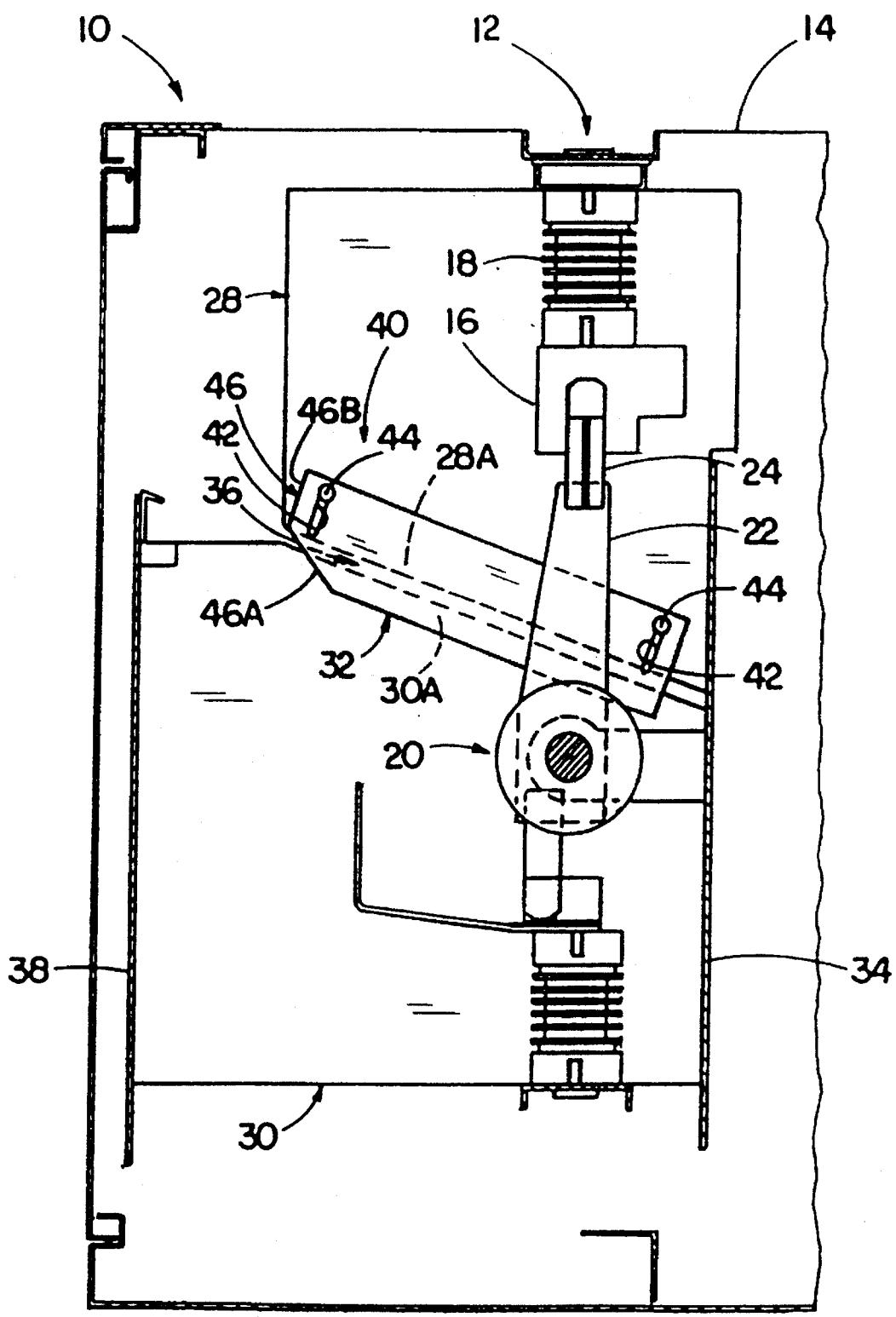
FIG. 2 is an enlarged side elevational view of one of the switchgear assemblies of the switchgear showing the barrier arrangement of the present invention seen along line 2—2 of FIG. 1, with an intermediate barrier panel of the barrier arrangement being disposed in a lowered position relative to a gap between upper and lower insulated barrier panels of the barrier arrangement.

Referring now to the drawings, and particularly to FIGS. 1 and 2, there is illustrated a multiple-phase distribution apparatus in the form of an air-insulated padmounted switchgear 10 which employs a plurality of electrical transmission components in the form of side-by-side spaced multi-phase switchgear assemblies 12. The switchgear assemblies 12 are disposed in an enclosure 14.

Each switchgear assembly 12 includes an upper conductor 16 supported in the enclosure 14 by an insulator 18 secured to the top of the enclosure 14 and a lower movable contact 20 being electrically connectable to the upper conductor 16. The lower movable contact 20 includes a blade 22 that is pivotable about a shaft between respective closed and opened positions relative to a fixed contact 24 of the upper conductor 16, as respectively seen in FIGS. 2 and 3. When in the closed position, the blade 22 is in engagement with the fixed contact 24 such that electrical current flows through the switchgear assembly 12. On the other hand when in the opened position, the blade 22 is pivoted out of engagement with fixed contact 24.

In accordance with the present invention, a plurality of barrier arrangements, generally designated 26, are incorporated in the padmounted switchgear 10. The barrier arrangements 26 are disposed vertically between the spaced adjacent switchgear assemblies 12 for separating the phases of electricity therewithin from one another to prevent physical contact or electrical communication between the phases by migration of electrically conductive gases formed inside arc chutes of the fixed contact 24 during electrical current interruption.

Figures 3, 4:
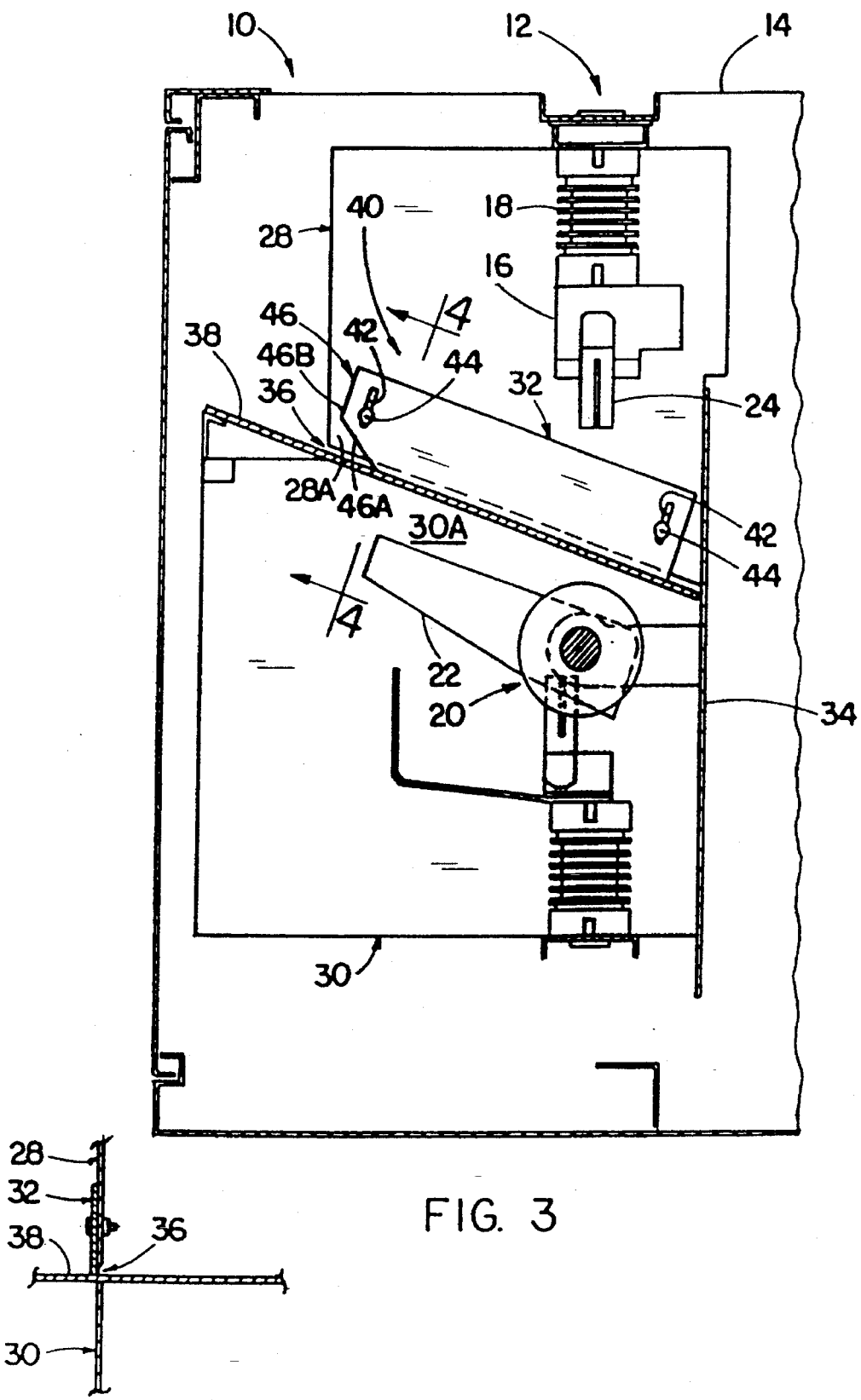
FIG. 3 is a view similar to that of FIG. 2 but showing the insulated intermediate barrier panel of the barrier arrangement being disposed in a raised position relative to the gap between the upper and lower barrier panels of the barrier arrangement due to insertion of a separate barrier plate therethrough into contact with the intermediate barrier panel.
FIG. 4 is a fragmentary vertical sectional view of the barrier panels taken along line 4—4 of FIG. 3.

Referring to FIGS. 2–4, each barrier arrangement 26 basically includes a pair of vertically-mounted, stationarily-positioned upper and lower barrier members 28, 30 and a vertically-mounted intermediate barrier member 32 being slidably movable relative to the upper and lower barrier members 28, 30. Referring to FIGS. 5–8, the upper and lower barrier members 28, 30 are in the form of a relatively flat upper and lower barrier panels 28, 30 made of a suitable electrically insulated or dielectric material. The upper and lower barrier panels 28, 30 abut against a permanent insulating barrier panel 34 that extends transversely across the rear of the enclosure 14 form one end to the other and are mounted in the enclosure 14 so as to be disposed in stationary positions with respect to one another in which they create a slot or gap 36 therebetween respective lower and upper edge portions 28A, 30A thereof at their time of their installation. The upper and lower barrier panels 28, 30 are so stationarily disposed at all times during operation of the switchgear assemblies 12 and also while maintenance is being performed on the lower portions of the switchgear assemblies. During these periods of maintenance, another or an additional barrier panel 38, being portable in construction and made of insulating material, is placed in a generally transverse or horizontal position in the gap 36 between the vertically-mounted insulated upper and lower barrier panels 28, 30 to electrically isolate the lower portion of the switchgear assembly 12 from the upper portion thereof and to prevent the vertical switch blades 22 from inadvertently closing and thus energizing the areas being serviced.

Referring to FIGS. 9 and 10, the intermediate barrier member 32 is in the form of a relatively flat panel 32 made of a suitable electrically insulated or dielectric material. The intermediate barrier panel 32 and upper barrier panel 28 have means 40 for mounting the intermediate barrier panel 32 to the upper barrier panel 28 to undergo sliding movement between the lowered and raised positions relative to the lower barrier panel 30 and thereby to respectively open and close the gap 36 between the upper and lower barrier panels 28, 30 in response to insertion and withdrawal of the transversely-disposed portable barrier panel 38 through the gap 36. The mounting means 40 includes a pair of first and second elongated slots 42 defined in one of the upper barrier panel 28 or intermediate barrier panel 32 and preferably in the latter. The first and second slots 42 are defined adjacent to respective forward and rearward end portions thereof and extend in the direction of movement of the intermediate barrier panel 32 between the lowered and raised positions. The mounting means 40 also includes a pair of first and second fasteners 44 mounted to the other of the upper barrier panel 28 or intermediate barrier panel 32 and preferably in the former. The first and second fasteners 44 are disposed adjacent to respective forward and rearward end portions thereof and to the lower edge portion 28A thereof. The first and second fasteners 44 project outwardly from apertures 45 in the lower edge portion 28A of the upper barrier panel 28 and through the respective first and second slots 42.

To facilitate its sliding movement between the lowered and raised positions, the intermediate barrier panel 32 has a forward edge 46 which includes a lower portion 46A facing forwardly and extending downwardly and rearwardly in an declining oblique angular relation to the direction of movement of the intermediate barrier panel 32 between the lowered and raised positions. Engagement by the transversely disposed portable barrier panel 38 with the angular lower portion 46A of the forward edge 46 of the intermediate barrier panel 32 causes a camming action thereon which lifts the intermediate barrier panel 32 from the lowered position of FIG. 2 to the raised position of FIG. 3. The forward edge 46 of the intermediate barrier panel 32 also includes an upper portion 46B extending generally parallel to the direction of movement of the intermediate barrier panel 32 between the lowered and raised positions.

To summarize, referring again to FIG. 2, the intermediate barrier panel 32 is normally disposed in the lowered position relative to and alongside the upper and lower barrier panels 28, 30 so as to extend across the gap 36 between the upper and lower insulated barrier panels 28, 30 and overlap with the lower edge portion 28A of the upper barrier panel 28 and the upper edge portion 30A of the lower barrier panel 30. Referring to FIG. 3, the intermediate barrier panel 32 is adapted to be moved to a raised position above the gap 36 set between the upper and lower insulated barrier panels 28, 30 due to insertion of the portable barrier planel 38 therethrough to isolate the upper portion of the switchgear assembly 12 from the bottom portion thereof while maintenance is being performed at the switchgear site. The lineman performing the maintenance inserts the portable barrier panel 38 when needed and then withdraws it when maintenance is completed.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the forms hereinbefore described being merely preferred or exemplary embodiments thereof.

I claim:

1. A barrier arrangement for use in a multiple-phase distribution apparatus including an enclosure and at least two electrical transmission components for controlling separate phases of electricity within the apparatus, the components being laterally spaced from one another, said barrier arrangement comprising:

(a) a pair of insulated upper and lower barrier panels mountable within the enclosure of the apparatus between the two electrical transmission components in spaced vertical tandem and stationary relation one above the other so as to define a gap therebetween;

(b) an insulated intermediate barrier panel disposed adjacent to said gap between said upper and lower barrier panels; and (c) means for mounting said intermediate barrier panel to said upper barrier panel so as to undergo movement between lowered and raised positions relative to said lower barrier panel so as to respectively open and close said gap between said upper and lower barrier panels in response to insertion and withdrawal of a transversely disposed additional barrier panel through said gap.

2. The arrangement as recited in claim 1, wherein said intermediate barrier panel has a forward edge including a lower portion extending downwardly and rearwardly in an declining oblique relation to the direction of movement of said intermediate barrier panel between said lowered and raised positions such that engagement of the transversely disposed additional barrier panel with said lower portion of said forward edge causes a camming action thereon which lifts said intermediate barrier panel from said lowered position to said raised position.

3. The arrangement as recited in claim 2, wherein said forward edge of said intermediate barrier panel also includes an upper portion extending generally parallel to the direction of movement of said intermediate barrier panel between said lowered and raised positions.

4. The arrangement as recited in claim 1, wherein said mounting means includes a first slot defined in one of said upper and intermediate barrier panels adjacent to a forward end portion thereof and extending in the direction of movement of said intermediate barrier panel between said lowered and raised positions.

5. The arrangement as recited in claim 4, wherein said mounting means includes a first fastener mounted to the other of said upper and intermediate barrier panels adjacent to the forward end portion thereof and projecting outwardly therefrom and through said first slot.

6. The arrangement as recited in claim 5, wherein said mounting means also a second slot defined in one of said upper and intermediate barrier panels adjacent to a rearward end portion thereof and extending in the direction of movement of said intermediate barrier panel between said lowered and raised positions.

7. The arrangement as recited in claim 6, wherein said mounting means includes a second fastener mounted to the other of said upper and intermediate barrier panels adjacent to the rearward end portion thereof and projecting outwardly therefrom and through said second slot.

8. The arrangement as recited in claim 7, wherein said intermediate barrier panel has a forward edge including a lower portion extending downwardly and rearwardly in an declining oblique relation to the direction of movement of said intermediate barrier panel between said lowered and raised positions such that engagement of the transversely disposed additional barrier panel with said lower portion of said forward edge causes a camming action thereon which lifts said intermediate barrier panel from said lowered position to said raised position.

9. The arrangement as recited in claim 8, wherein said forward edge of said intermediate barrier panel also includes an upper portion extending generally parallel to the direction of movement of said intermediate barrier panel between said lowered and raised positions.

10. In a multiple-phase distribution apparatus including an enclosure and at least two electrical transmission components for controlling separate phases of electricity within said apparatus and being laterally spaced from one another, a barrier arrangement comprising:

(a) a pair of insulated upper and lower barrier panels mounted within said enclosure of said apparatus between said electrical transmission components in spaced vertical tandem and stationary relation one above the other so as to define a gap therebetween;

(b) an insulated intermediate barrier panel disposed adjacent to said gap between said upper and lower barrier panels; and (c) means for mounting said intermediate barrier panel to said upper barrier panel so as to undergo sliding movement between lowered and raised positions relative to said lower barrier panel so as to respectively open and close said gap between said upper and lower barrier panels in response to insertion and withdrawal of a transversely disposed additional barrier panel through said gap.

11. The arrangement as recited in claim 10, wherein said intermediate barrier panel has a forward edge including a lower portion extending downwardly and rearwardly in an declining oblique relation to the direction of movement of said intermediate barrier panel between said lowered and raised positions such that engagement of the transversely disposed additional barrier panel with said lower portion of said forward edge causes a camming action thereon which lifts said intermediate barrier panel from said lowered position to said raised position.

12. The arrangement as recited in claim 11, wherein said forward edge of said intermediate barrier panel also includes an upper portion extending generally parallel to the direction of movement of said intermediate barrier panel between said lowered and raised positions.

13. The arrangement as recited in claim 10, wherein said mounting means includes a first slot defined in one of said upper and intermediate barrier panels adjacent to a forward end portion thereof and extending in the direction of movement of said intermediate barrier panel between said lowered and raised positions.

14. The arrangement as recited in claim 13, wherein said mounting means includes a first fastener mounted to the other of said upper and intermediate barrier panels adjacent to the forward end portion thereof and projecting outwardly therefrom and through said first slot.

15. The arrangement as recited in claim 14, wherein said mounting means also a second slot defined in one of said upper and intermediate barrier panels adjacent to a rearward end portion thereof and extending in the direction of movement of said intermediate barrier panel between said lowered and raised positions.

16. The arrangement as recited in claim 15, wherein said mounting means includes a second fastener mounted to the other of said upper and intermediate barrier panels adjacent to the rearward end portion thereof and projecting outwardly therefrom and through said second slot.

17. The arrangement as recited in claim 16, wherein said intermediate barrier panel has a forward edge including a lower portion extending downwardly and rearwardly in an declining oblique relation to the direction of movement of said intermediate barrier panel between said lowered and raised positions such that engagement of the transversely disposed additional barrier panel with said lower portion of said forward edge causes a camming action thereon which lifts said intermediate barrier panel from said lowered position to said raised position.

18. The arrangement as recited in claim 17, wherein said forward edge of said intermediate barrier panel also includes an upper portion extending generally parallel to the direction of movement of said intermediate barrier panel between said lowered and raised positions.

* * * * *